No. 607,174. Patented July 12, 1898.
O. S. JORDAN & E. F. BAUM.
ENVELOP SEALING MACHINE.
(Application filed Aug. 31, 1897.)
(No Model.)
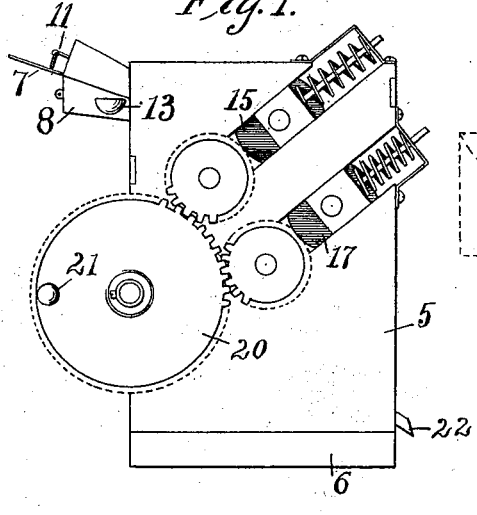
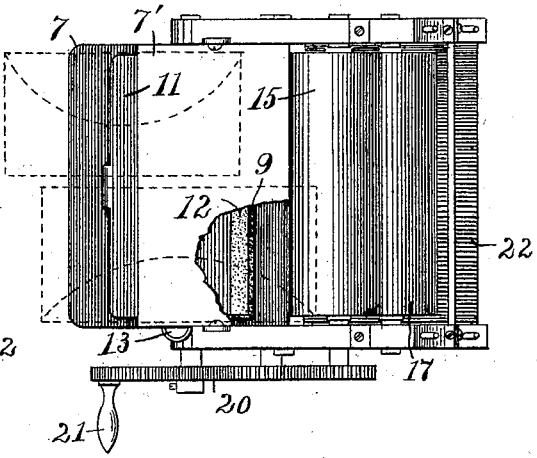
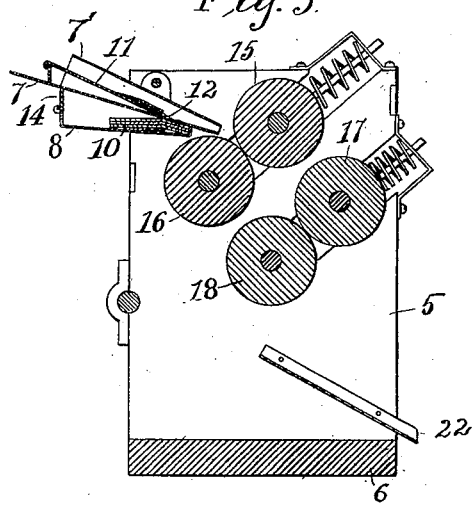
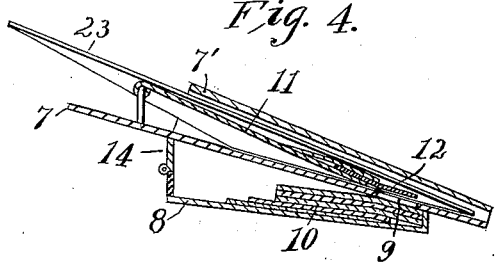
Witnesses:
C. L. Belcher
Inventors
Oliver S. Jordan
Edward F. Baum
By
Attorney
THE NORRIS PETERS CO., PHOTO-LITHO., WASHINGTON, D. C.

UNITED STATES PATENT OFFICE.

OLIVER S. JORDAN, OF NEWARK, NEW JERSEY, AND EDWARD F. BAUM, OF HARRISBURG, PENNSYLVANIA, ASSIGNORS OF ONE-HALF TO HENRY D. FULLER, OF NEW YORK, AND DAVID HYMAN, OF ROCHESTER, NEW YORK.

ENVELOP-SEALING MACHINE.

SPECIFICATION forming part of Letters Patent No. 607,174, dated July 12, 1898.

Application filed August 31, 1897. Serial No. 650,089. (No model.)

*To all whom it may concern:*

Be it known that we, OLIVER S. JORDAN, residing at Newark, in the county of Essex and State of New Jersey, and EDWARD F. BAUM, residing at Harrisburg, in the county of Dauphin and State of Pennsylvania, citizens of the United States, have invented certain new and useful Improvements in Envelop-Sealing Machines, of which the following is a specification.

This invention relates to envelop-moisteners, and particularly to a machine for automatically moistening and sealing envelops.

The main object of this invention is to provide means for moistening the gum on the free flap of an envelop without unfolding said flap, whereby the envelop may be immediately sealed by applying pressure thereto.

Another object is the construction of a machine whereby the gum on the free flap of an envelop may be moistened and the envelop sealed and both these acts executed automatically.

To this end the invention consists in the construction, combination, and arrangement of parts substantially as hereinafter fully described, and set forth in the claims.

In the accompanying drawings, which form a part of this specification, Figure 1 represents the stamp moistening and sealing machine in side elevation. Fig. 2 is a plan thereof. Fig. 3 is a vertical section of said machine. Fig. 4 is a detail view of the moistening apparatus shown on an enlarged scale.

The machine consists of what may be termed "two sections," one that for applying moisture to the gum of the free flap of an envelop and the other for sealing the envelop, both of which parts coöperate and perform their work automatically.

In the drawings, 5 indicates the side frames of the machine, which may be of any suitable material and construction and which are here shown as mounted upon the base 6. To this frame is attached in any suitable manner the bed-plate 7 of the moistening-section of the machine, which, as a matter of convenience, is inclined downwardly, as illustrated. To insure the proper guidance of the envelops in the rapid operation of the machine, suitable side pieces may be raised from the plate 7 and a cover 7' attached thereto, thereby forming with the plate and sides a guide or hopper into and through which the envelops are fed. Under this hopper, supported in any suitable way, but preferably connected to the plate 7, is a trough or water-reservoir 8, into which an opening is made through the bed-plate, near the lower end thereof, as at 9. This trough is preferably restricted near its lower end, where it opens into the hopper, and in this restricted portion are located a series of wicks 10 or a mass of any other suitable fibrous or absorbent material, as flannel or sponge, which will serve to prevent the water from flowing from the trough and yet will constantly maintain a moist surface at the opening 9.

Above the plate or within the hopper is located the moistening device proper, which preferably consists of a plate, as 11, carrying at its lower edge a wick or other suitable absorbent material 12, which will readily take up water and apply it to anything which comes in contact therewith. This plate may be mounted above the bed-plate 7 in any suitable manner, so that its absorbent portion may move freely to and from its normal position of rest upon the moist surface of the absorbent material 10. Said plate 11 is preferably hinged at the rear edge, as illustrated, at a short distance from the bed-plate 7. The wick in the forward end resting freely upon the wicks in the trough takes its moisture therefrom. The wick or other absorbent material may be secured in the edge of the swinging plate in any suitable manner, here shown as confined between two plates of which it is composed. Water may be added to the trough as needed from time to time through the funnel 13.

The upper portion of the rear wall of the water-reservoir may be provided with a suitable opening, shown here as closed by the door 14, through which the wicks 10 may be inserted or removed.

At the lower end of the hopper and suitably journaled in the frames 5 are the feeding-rollers 15 16. These rollers are under spring tension, which is sufficient simply to enable them to draw an envelop through the hopper and pass it to the sealing-rolls 17 18, which are held together with sufficient force to thoroughly seal the envelops passed between them. As indicated in the drawings, the springs at the latter pair of rolls are under greater tension than those at the former pair of feeding-rolls. Any suitable tension devices may be added to these springs to vary the pressure between the rolls, as desired.

The mechanism for driving the feeding and pressing rolls may be of any of the well-known forms and actuated by hand or any other convenient power.

In the drawings the lower rolls—that is, rolls 16 and 18—are shown provided with pinions on their axles, with which meshes the driving-gear 20. The latter may be provided with a wrist-pin or handle 21, as indicated, for applying power thereto.

Below the pressing-rolls is located a delivery-chute 22, which may be of any suitable shape or construction that will satisfactorily effect the discharge of the sealed envelops.

The operation of the machine is as follows: Power being applied thereto the envelops are fed into the machine endwise, as indicated in dotted lines in Fig. 2, the body of the envelop passing down over the plate 11, while the flap passes along the under side thereof and serves to lift the moistening device or wick 12 from the wicks 10, the former thereby passing over the gum on the flap and wetting the same, an envelop 23 being shown in this position in Fig. 4. As the envelop passes through the hopper it is caught by the rolls 15 16 and drawn along until it enters the rolls 17 and 18, which serve to press the moistened flap snugly against the body of the envelop and so effect the sealing.

The machine as constructed is designed to moisten and seal two lines of envelops at once.

It will be noted that the bed of wicks 10 lies sufficiently below the surface of the bed-plate to prevent them from soiling the outer side of the flap. Indeed, the envelops might be fed through the hopper with the body portions below and the flaps above the plate 12 without the wicks 10 soiling the envelops. A better effect is produced, however, by feeding the envelops through as first described.

Many changes may be made in the construction, location, and formation of the parts of this machine without departing from the spirit of the invention.

What we claim as our invention is—

1. The combination with the moistening-trough provided with absorbent material at its outlet, of the hinged plate carrying an absorbent material at its free edge, and means for feeding envelops past said edge, as and for the purpose set forth.

2. The combination with the moistening-trough provided with absorbent material at its outlet, of the hinged plate carrying an absorbent material at its free edge for engagement with the absorbent material, the pair of feeding-rolls at the end of the trough, and the pair of pressing or sealing rolls following the feeding-rolls, as and for the purpose set forth.

3. The combination with the hopper and the trough 8, under it, provided with the opening 9, of a moistening-pad in the trough at said opening, and the plate 11 provided with a strip of absorbent material at its edge resting normally on said pad, as and for the purpose set forth.

4. The combination with the plate 7, of a moistening-pad as 10, located below an opening therein, a movable plate as 11, hinged at one end above the plate 7, and provided with a strip of absorbent material at its free edge normally resting upon said pad for the purpose set forth.

Signed at New York, in the county of New York and State of New York, this 27th day of August, A. D. 1897.

OLIVER S. JORDAN.

Witnesses:
WM. H. CAPEL,
DELBERT H. DECKER.

Signed at Harrisburg, in the county of Dauphin and State of Pennsylvania, this 26th day of August, A. D. 1897.

EDWARD F. BAUM.

Witnesses:
R. S. CARE,
V. GRANT FORRER.